United States Patent
Gargett et al.

(10) Patent No.: US 12,045,202 B2
(45) Date of Patent: Jul. 23, 2024

(54) LOGICAL BLOCKS ANALYSIS IN AN ELECTRONIC FILE SYSTEM VOLUME

(71) Applicant: Crowdstrike, Inc., Sunnyvale, CA (US)

(72) Inventors: Mark Ian Gargett, Brighton (GB); Jayasankar Divakarla, Bangalore (IN); John Stringer, Eynsham (GB)

(73) Assignee: Crowdstrike, Inc., Sunnyvale, CA (US)

(*) Notice: Subject to any disclaimer, the term of this patent is extended or adjusted under 35 U.S.C. 154(b) by 199 days.

(21) Appl. No.: 17/860,754

(22) Filed: Jul. 8, 2022

(65) Prior Publication Data
US 2024/0012790 A1    Jan. 11, 2024

(51) Int. Cl.
*G06F 16/17* (2019.01)
(52) U.S. Cl.
CPC .................. *G06F 16/1734* (2019.01)
(58) Field of Classification Search
CPC ................... G06F 16/1734; G06F 16/164
See application file for complete search history.

(56) References Cited

U.S. PATENT DOCUMENTS

| | | | |
|---|---|---|---|
| 11,620,270 B2* | 4/2023 | Kambhammettu | G06F 16/2358 707/741 |
| 11,928,733 B2* | 3/2024 | Hunter | G06F 16/2457 |
| 2019/0095102 A1* | 3/2019 | Wade | G06F 3/0653 |
| 2019/0095440 A1* | 3/2019 | Chakra | G06F 16/1734 |
| 2019/0235761 A1* | 8/2019 | Watkins | G06F 3/0644 |

* cited by examiner

*Primary Examiner* — Jorge A Casanova
(74) *Attorney, Agent, or Firm* — Elliott, Ostrander & Preston, P.C.

(57) ABSTRACT

One or more identifiers respectively corresponding to a one or more logical blocks in an electronic file system volume is selected. One or more logical blocks respectively corresponding to the selected one or more identifiers is analyzed according to one or more criteria. A value is assigned to one or more indicators associated with each of the one or more logical blocks and corresponding to the one or more criteria, in response to the analyses of the corresponding one or more logical blocks. A representation of the one or more indicators, and their respective assigned values, associated with each of the one or more logical blocks that was analyzed according to the one or more criteria, is generated. In some embodiments, an action to be performed on or with an electronic file mapped to the logical blocks is controlled based on one or more of the values assigned to the one or more indicators associated with the one or more logical blocks.

20 Claims, 5 Drawing Sheets

LOGICAL BLOCKS ANALYSIS IN AN ELECTRONIC FILE SYSTEM VOLUME

CROSS REFERENCE TO RELATED DOCUMENTS

N/A

TECHNICAL FIELD

Embodiments relate to an electronic data protection system that involves file logical block analysis in an electronic file system volume.

BACKGROUND

Electronic data (or, simply, "data") loss prevention, or data protection, solutions typically employ heuristics to analyze data on a data storage system at or near the time the data is acted on in some way, such as when files are created or edited, copied to a new location or transferred from a computing system to or from, a cloud computing system, an external computing system, or a data storage device.

The outcome of this analysis may be metadata, such as a classification of data sensitivity, content type, etc., and the generated metadata typically is stored alongside the original data in some system-specific way such as alternate data streams, extended file attributes, and shadow files.

One drawback of these solutions is the compromise between performance and effectiveness of the analysis. The more effective the analysis of the data the more compute time and effort is usually required to perform the analysis, and whenever this analysis is to be completed to allow or block a decision to take some action on the data, the user experience may be noticeably impacted.

What is needed is a solution that decouples the data analysis or classification effort from the user interface experience, and at the same time, provides an incremental, multi-pass approach to the classification effort itself, which allows for changes and updates to the classification effort with minimal impact.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
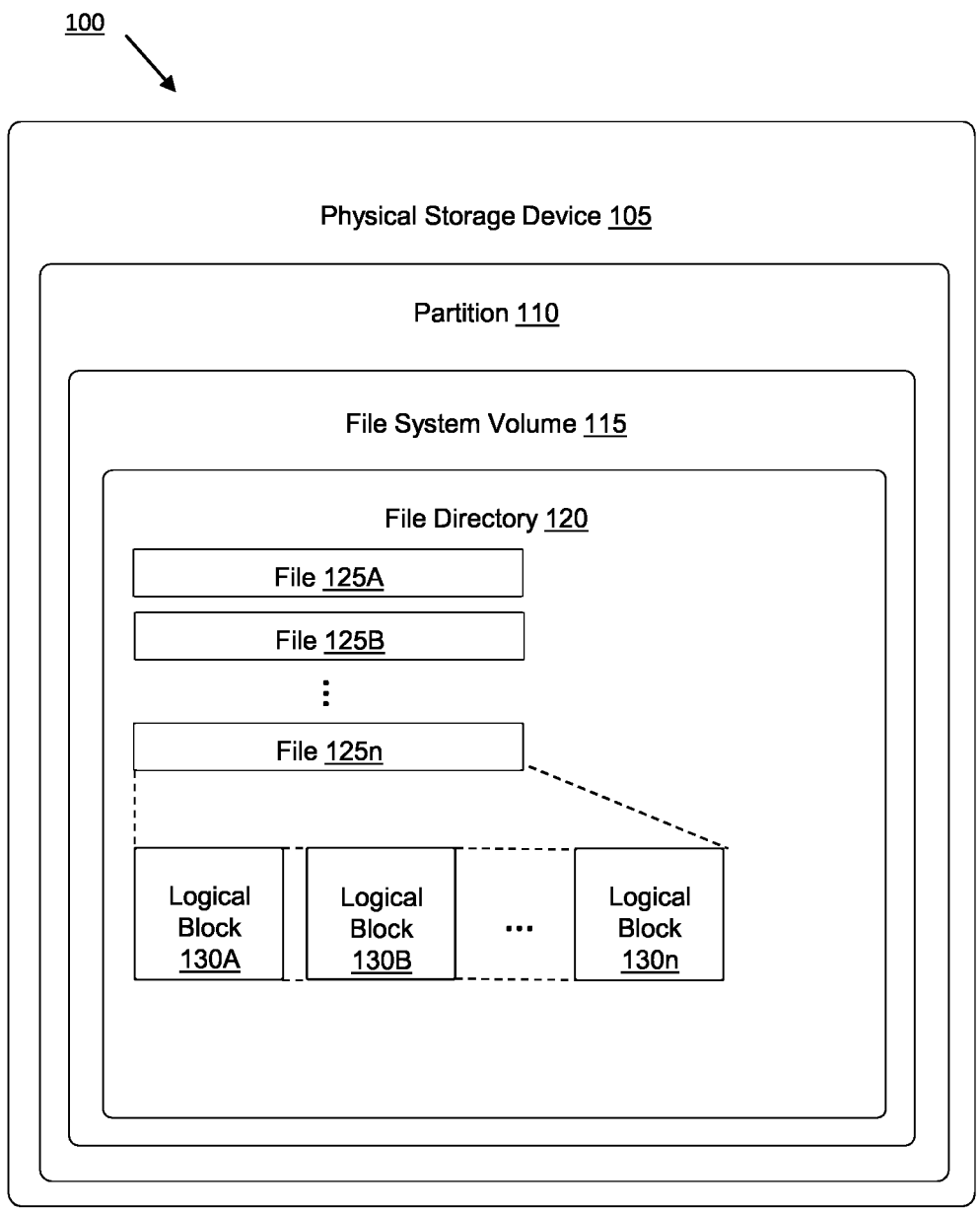
FIG. 1 illustrates an example file system volume upon which embodiments may operate.

With reference to FIG. 1, although users almost universally interact with electronic data on computers through the medium of files and file directories, most modern operating systems include an abstraction layer that maps these objects to one or more "logical blocks" that are transferred between memory and a permanent storage medium in which the files and file directories physically reside. These logical blocks are typically at least one level of abstraction above the physical medium storage layer. An example mapping 100 is illustrated in FIG. 1. A physical storage device 105, such as a disk drive, or a non-volatile memory device such as but not limited to a flash drive, a thumb drive, a solid-state drive, ROM, EPROM, etc., may include one or more physical partitions 110 that exist at the physical, media specific level. The physical storage device 105 (e.g., "hard disk 1" or "hard disk 2" in a Windows OS that has two physical hard drives), and a partition 110 if it exists (e.g., "partition 1" or "partition 2" on "hard disk 1" in a Windows OS), contains a file system volume 115 (which may be called a logical drive or "drive", such as "Drive C:" or "Drive D:"). The file system volume 115 exists at the operating system level and supports a single file system (e.g., NTFS or FAT32 in a Windows OS) which in turn includes a file directory 120 with multiple files 125A, 125B, ..., 125n each located at a specific position in the file directory 120.

The operating system maps objects, such as files, to one or more logical blocks, for example, a file 125A may be mapped to one or more logical blocks 130A, 130B, ..., 130n, depending on its size. If file 125 is small, say, less than the size of a logical block (e.g., 4096 bytes, or 4 Kbytes in Windows OS), then the file is mapped to a single logical block. If file 125 is larger than one logical block, it may be mapped to two or more logical blocks, or however many logical blocks is needed to store all the contents of file 125. A mapping of a file to one or more logical blocks is kept for all files in the file system volume and used to locate the file, for example, when the file is accessed, such as when a read or write operation occurs with the file.

Logical blocks are often the smallest level of granularity for the file system volume in terms of access. Even if many files are much smaller than the size of a logical block, a unique logical block is mapped for each file, and even if a file is only a few bytes in size, the operating system reads an entire logical block into memory to access that file. Example embodiments operate at or on this smallest unit or block of file content in the filesystem.

Most data loss prevention, or data protection, solutions introduce a system performance burden due to both the complexity of data analysis and the need to perform the data analysis ahead of, or before allowing, certain operations on files. The more useful and reliable the analysis is or tries to be (in terms of both data detection and false positive rejection), generally the more effort required. Typically, data protection analysis involves scanning a file after some trigger event occurs using a set of rules, such as a set of predefined classification rules, and then storing the outcome, such as a classification, alongside or associated with the file in some way—alternate data streams, extended attributes, or side-by-side files are all possible ways of storing the results depending on the underlying file system. Such an approach presents challenges. For example, if the data protection system intends to block behavior (e.g., copying a file) based on a classification of the file and in particular its contents then the analysis can cause significant delay and performance impact. Further, a change in the classification rules can prompt a partial or complete re-analysis of some or all files in the filesystem, and if file contents are changed (e.g., the file is edited), the partial or complete re-analysis of the file may be needed.

Data loss prevention, or data protection, as those terms are used herein and generally in the industry, refer to the process of safeguarding important data from corruption, compromise or loss and providing the capability to restore the data to a functional state should something happen to render the data inaccessible or unusable. Data protection assures that data is not corrupted, is accessible for authorized purposes only, and is in compliance with applicable legal or regulatory requirements. Protected data should be available when needed and usable for its intended purpose. The scope of data protection, however, may go beyond the notion of data availability and usability to cover areas such as data immutability, preservation, and deletion/destruction. Generally, data loss prevention, or data protection, involves three categories, namely, traditional data protection (such as backup and restore copies), data security, and data privacy. The processes and technologies used to protect and secure data can be considered as data protection mechanisms to achieve the overall goal of continual availability, and immutability, of critical data.

Described herein are systems and methods associated with a data protection system that can address these and other deficiencies. For example, the embodiments described herein perform analysis at the file system logical block level instead of at the file level, which means that analysis can be performed at an arbitrary time, up front of any operations involving a file. Additionally, example embodiments perform analysis as a series of discrete sub-analyses which allows for very fast down selection of candidate logical blocks. The discrete nature of the sub-analyses makes it relatively easier to introduce new classification rules or modify existing rules with minimal performance impact. The approaches described herein shift away from the file level abstraction to the logical block level for the classification analysis, which improves the performance and speed of data protection systems that utilize such analysis, and benefits users by appearing less sluggish than existing tools. For instance, detecting the attempted transfer of a file to an external location, such as from a computing device to a location in the cloud, confirming the transfer is acceptable according to a pre-determined classification the file, and allowing the transfer to occur, can be accomplished almost instantaneously, preventing significant system slowdown and limiting or even eliminating the risk of not detecting the transfer in time, before it actually occurs.

Figure 2:
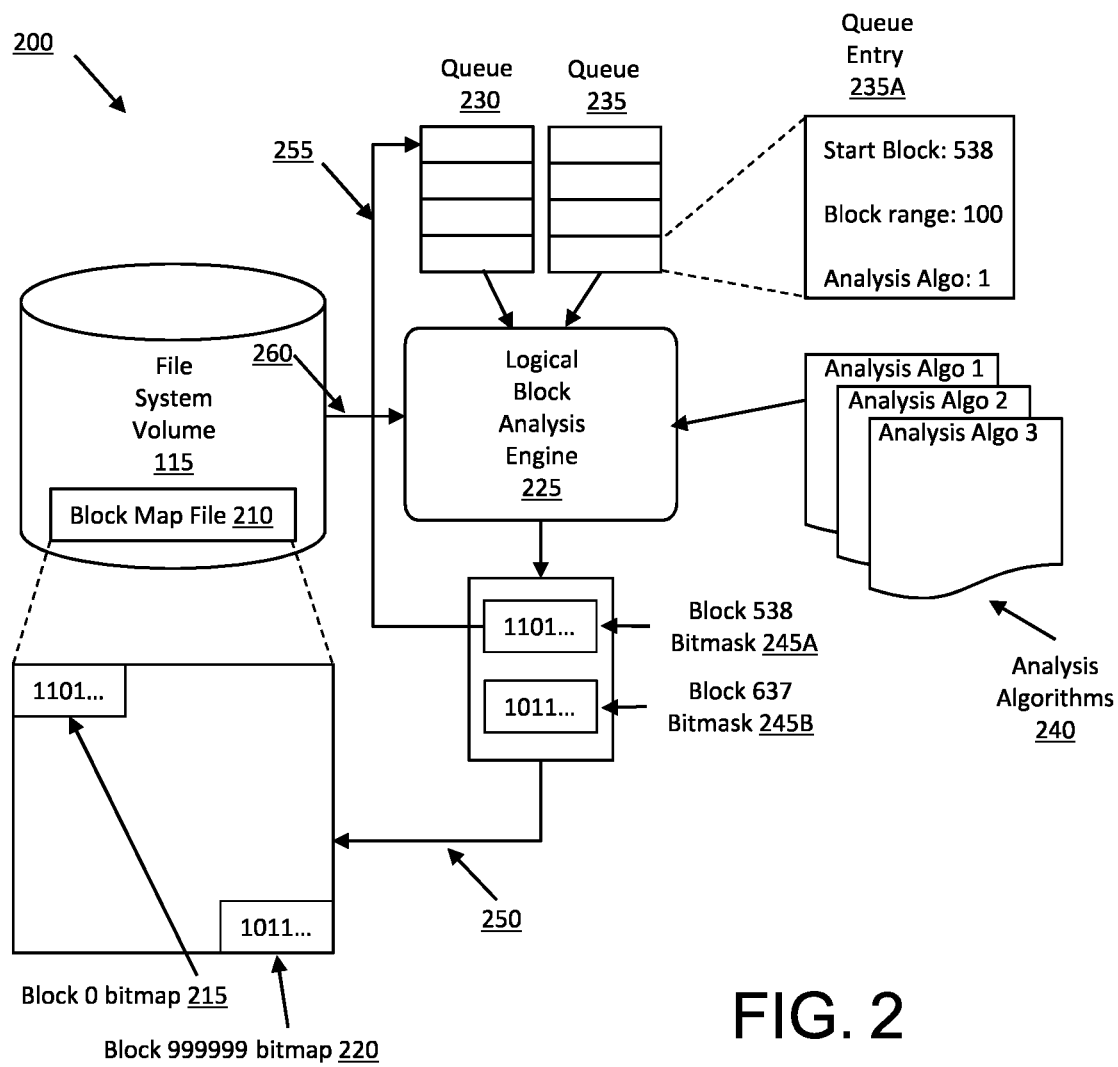
FIG. 2 is a functional block diagram according to the disclosed embodiments.

FIG. 2 is a functional block diagram 200 of relevant aspects of a system architecture 500 for a computing system 501 more generally described below with reference to FIG. 5. The computing system comprises one or more processors that execute logic that performs the processes described with reference to flowcharts 300 and 400 in FIGS. 3 and 4 according to example embodiments, as follows.

Logical Block Analysis Engine (LBA) 225 receives as input a selected one or more logical block identifiers (or, simply, "identifiers") respectively corresponding to one or more logical blocks 130A, 130B, 130n, in an electronic file system volume 115. For example, LBA 225 may receive this input from one or more queues 230 and 235. While FIG. 2 illustrates two queues, other embodiments may implement a single queue, or more than two queues. The queues may be prioritized such that LBA 225 obtains input from a higher priority queue before obtaining input from the lower priority queue when both queues have entries for one or more identifiers corresponding to one or more logical blocks in the electronic file system, ready to be processed. Alternatively, or additionally, entries for identifiers within a queue can be prioritized, and/or read from the queue in a prioritized manner, according to a particular queue access scheme, such as a first-in, first out (FIFO) scheme where the oldest or first entries added to the queue are first obtained by LBA 225 for processing.

Figure 3:
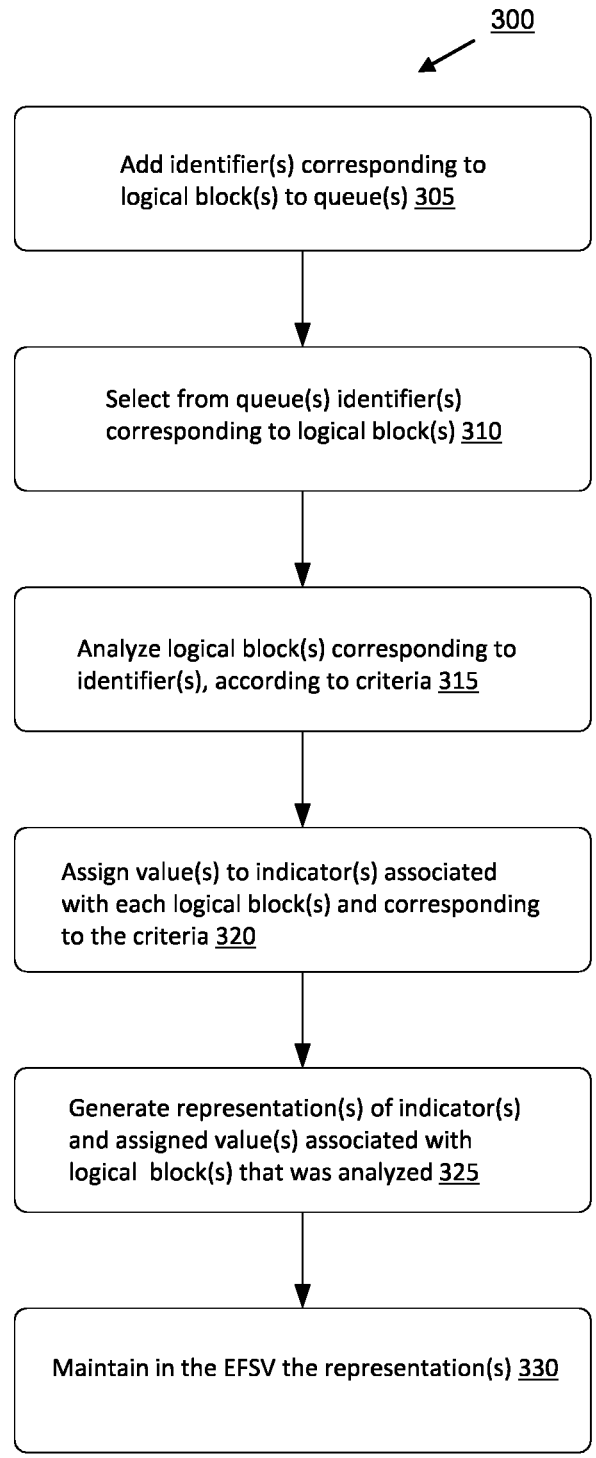
FIG. 3 is a flow chart according to the disclosed embodiments.
Figure 4:
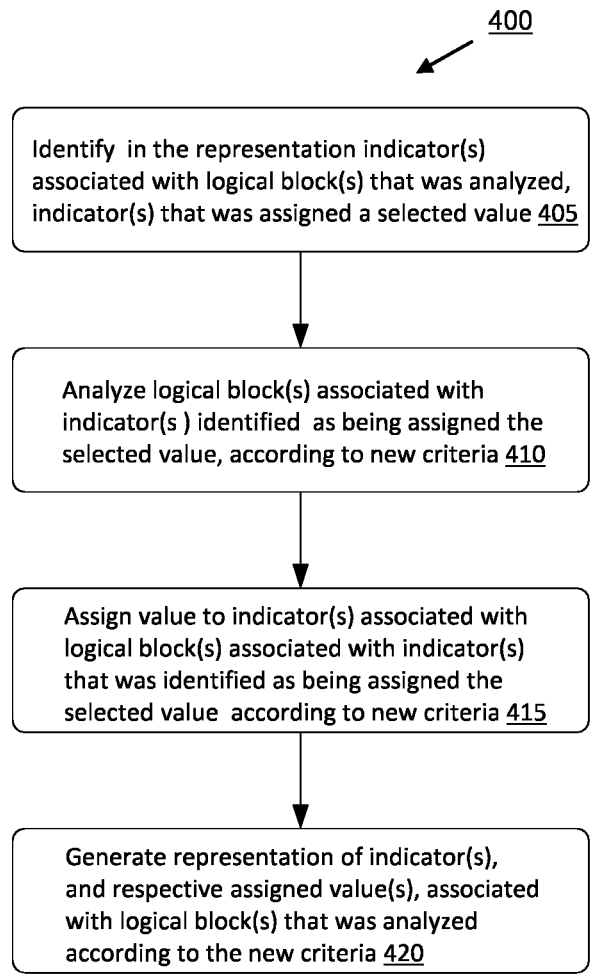
FIG. 4 is a flow chart according to the disclosed embodiments.

With reference to FIG. 3, a file system driver or the like can add, at block 305, the one or more identifiers respectively corresponding to the one or more logical blocks 130 in the electronic file system volume 115 to the one or more queues 230 and 235. According to embodiments, the file system driver can decide into which queue to add an identifier based on logical block level or file level characteristics or classifications associated with the logical blocks or the file(s) that maps to the logical blocks identified by the identifier, as discussed further below.

According to one example, the file system driver can identify one or more identifiers corresponding to one or more logical blocks in the electronic file system volume to which a particular file is mapped such as when an operation occurs with the file, such as a write operation, or a copy or move operation. The file system driver can then add at block 305 the one or more identifiers respectively corresponding to the one or more logical blocks in the electronic file system volume to which the file is mapped to the one or more queues 230 and 235. According to another example, the file system driver can identify one or more identifiers corresponding to one or more logical blocks in the electronic file system volume to which a particular file is mapped such as when an operation occurs with the file that changes the contents of the file or meta-data associated therewith, in some manner, such as a write operation. The file system driver can then add at block 305 to the one or more queues only the one or more identifiers corresponding to the one or more logical blocks in the electronic file system volume to which the file is mapped that changed as a result of the writing to the electronic file.

Once there are one or more identifiers corresponding to one or more logical blocks in the electronic file system added to queue 230 and/or queue 235, LBA 225 may select, at block 310, from the one or more queues 230 and 235 one or more identifiers respectively corresponding to the one or more logical blocks in the electronic file system volume. For example, LBA 225 may select queue entry 235A in queue 235 which consists of a logical block identifier 538. Queue entry 235A also specifies identifier 538 is the starting identifier for a range of 100 logical block identifiers. Thus, LBA 225 selects for processing logical block identifiers 538-637. According to embodiments, the 100 logical block identifiers correspond to logical blocks 130 that map to one or more different files 125 in file system volume 115. Since more than one logical block 130 may be mapped to a single file 125 depending on the file size, LBA 225 may analyze logical blocks for anywhere from one to 100 different files in this example.

Optionally, embodiments may specify one or more algorithms, for example, classification schemes, by which to analyze the logical blocks, in the queue entry itself. Thus, for example, queue entry 235A specifies a first algorithm ("analysis algorithm 1") by which to analyze the logical blocks 130 corresponding to the identifiers 538-637. The analysis algorithm 1 is selected from a group of analysis algorithms 240, such as the three algorithms depicted. Alternatively, an identifier itself may inform which algorithm(s) to choose to analyze a corresponding logic block. Similarly, the contents, or the previous classification, of a logic block associated with an identifier may inform which algorithm(s) to choose to analyze the logic block.

At block 315, LBA 225 reads from file system volume 115, as depicted at 260, and analyzes the one or more logical blocks respectively corresponding to the one or more identifiers selected, i.e., pulled from or popped off, the one or more queues 230 and 235, according to one or more criteria. For example, the LBA 225 may analyze the logical blocks according to one of analysis algorithms 240 to determine whether the contents of each contain high entropy or low entropy data, or null or no data.

Once analysis is completed, LBA 225 at block 320 assigns and outputs a value to one or more indicators associated with each of the one or more logical blocks that was analyzed according to the one or more criteria. For example, LBA 225 may analyze logical blocks 538-637 according to analysis algorithm 1 to determine whether each of the logical blocks contain high entropy data, low entropy data, or no data, and output a value, such a one-bit value of 1, 0, or null, assigned to an entropy indicator for each of the one or more logical blocks. In this example, a single indicator is assigned a single value for each logical block. However, it is appreciated that values for more than one indicator could be generated as a result of the analysis LBA 225 performs at block 315.

According to embodiments, it is useful to generate at block 325 a representation of some kind or in some form for the values of the indicators generated as a result of the LBA 225 performing an analysis on one or more logical blocks. A convenient and efficient solution for doing so involves generating a bitmask, 245A or 245B to represent the one or more indicators, and their respective assigned values, associated with each of the one or more identifiers for logical blocks, or associated directly with each of the one or more logical blocks, that were analyzed according to the one or more criteria by LBA 225 at block 315. Thus, in this example, LBA 225 generates at block 325 a bitmask 245A for logical block 538, a bitmask 245B for logical block 637, and corresponding bitmasks for all the intervening logical blocks 539-636 (not shown). In the bitmask, the first bit may, for example, be used to store the representation of an entropy indicator, wherein if the first bit position is set to one, it indicates the logical block contains high entropy data, and if the first bit position is set to zero, it indicates the logical block contains low entropy data.

According to some embodiments, these representations of the one or more indicators, and their respective assigned values, associated with each of the one or more logical blocks that was analyzed, are maintained at block 330, for example, in the electronic file system volume. Thus, for example, the bitmasks 245A and 245B of the one or more logical block identifiers 538 and 637, and their respective assigned values, associated with each of the one or more logical blocks that was analyzed, are transmitted as indicated at 250 in FIG. 2 and maintained at block 330, in a block map file 210 in the electronic file system volume 115. FIG. 2 illustrates a file system volume 115 comprising as an example one million logical blocks (0 to 999,999) and thus one million bitmasks, one for each logical block, starting with logical block 0 bitmask 215 and continuing to logical block 999999 bitmask 220. In some embodiments, this information is maintained in association with the corresponding logical block identifier for the logical block.

Advantageously, the above-described process, operating at the logical block layer of the filesystem, can be iterative. In this manner, logical blocks that have been analyzed can be analyzed again, according to the same or different criteria, irrespective of any operations related to the files to which the logical blocks are mapped. The bitmasks of the one or more indicators, and their respective assigned values, associated with each of the one or more logical blocks that was analyzed, can be fed back, or transmitted, as indicated at 255 in FIG. 2 either directly as they were output by LBA 225, or indirectly, by reading the bitmasks from the block map file 210 in the electronic file system volume 115. The bitmasked values for one or more indicators can be used to select into which queue 230 or 235 to add the logical blocks to be analyzed and by which algorithm(s). This process 400 is described in more detail with reference to FIG. 4, as follows.

At block 405, LBA 225 can identify in the representation of the one or more indicators associated with each of the one or more logical blocks that was analyzed, one or more indicators that was assigned a selected value. For example, the LBA can identify in a bitmask of indicators associated with each of the one or more logical blocks that has been analyzed, an indicator such as the entropy indicator that has been assigned a value of 0 indicating the logic block contains low entropy data.

At block 410, the LBA 225 can analyze the one or more logical blocks associated with the one or more indicators that was identified as being assigned the selected value, according to one or more new criteria. Continuing with the above example, the LBA can analyze one or more logical blocks that was identified in the bitmask of indicators associated with each of the one or more logical blocks as a logic block that contains low entropy data, according to the entropy indicator in the respective bitmask for those logical blocks. In this manner, low entropy logic blocks can be queued and selected, just like as described above with reference to blocks 305 and 310 of the flowchart 300 depicted in FIG. 3. More detailed or further analysis with one or more different analysis algorithms, according to new criteria, can then be conducted at block 410, the result of which will be an update to the per-logical block bitmask, and potentially re-queuing for further subsequent analysis. By repeatedly re-queuing logical blocks of interest, many layers of analysis can be accommodated and added over time. Each pass may potentially restrict the input as to which logical blocks will be analyzed in the next pass, allowing for more complex and costly analysis only when appropriate.

Returning to FIG. 4, after the LBA 225 analyzes the one or more logical blocks associated with the one or more indicators that was identified as being assigned the selected value according to one or more new criteria, LBA 225 at block 415 assigns a value to one or more indicators associated with each of the one or more logical blocks associated with the one or more indicators that was identified as being assigned the selected value and corresponding to the one or more new criteria. LBA 225 then generate at block 420 a representation of the one or more indicators, and their respective assigned values, associated with each of the one or more logical blocks that was analyzed according to the one or more new criteria. In short, the bitmask for each logical block is updated according to this subsequent analysis at block 410. This updated bitmask can be maintained in the same manner as describe above in connection with block 330 of FIG. 3.

Advantageously, some embodiments can assign a value to one or more indicators associated with a file mapped to one or more logical blocks, based on the respective assigned values of the one or more indicators associated with each of the one or more logical blocks in the electronic file system to which the file is mapped. To accomplish this, LBA 225 receives one or more identifiers corresponding to one or more logical blocks in the electronic file system to which an electronic file is mapped, and then obtains the representation of the one or more indicators, and their respective assigned values, associated with each of the one or more corresponding logical blocks. A value can be assigned to the one or more indicators associated with the file based on the respective assigned values of the one or more indicators associated with each of the one or more logical blocks corresponding to the one or more logical blocks in the electronic file system to which the electronic file is mapped. It is then possible for the file system to control an action to be performed on or with the file based on the value assigned to the one or more indicators associated with the file, and so file-level control can be based on the results of logical block level analysis of logical blocks to which the file is mapped. Because the embodiments described herein perform analysis at the file system logical block level instead of at the file level, that analysis can be performed at an arbitrary time, up front of any operations involving the file that maps to the logical blocks analyzed at the logical block level. Because embodiments perform analysis as a series of discrete sub-analyses according to the above described iterative process, very fast down selection of logical blocks as candidates for further analysis can be made.

Thus, the above describe embodiments involve a relatively low bandwidth process that "walks" the logical blocks of a file system volume, performing some level of analysis on these logical blocks largely irrespective of the file mapping status (although it may be sensible to ignore certain blocks mapped to specialist files, like the hibernation-file/page-file in a Windows OS). As discussed, this logical block walker process can consume a prioritized queue, or multiple queues, of logical block ranges to be processed. It is appreciated these queues can be persisted across system boots. Further, the processes outlined above use one or more analysis algorithms, and each algorithm can be designed to efficiently classify logical blocks in some way. An example analysis algorithm might simply classify each block as either blank or containing high entropy or low entropy data. Such an analysis could be used as the initial algorithm for very quickly triaging logical blocks that warrant further analysis.

The output of each logical block analysis is recorded in a bitmask, with the bitmask for each logical block representing the analyses performed and the outcomes, and the collection of these bitmasks can be persisted in a block map database in a similar manner as the file-to-block mapping is recorded by the filesystem. The bitmask of each logical block thereby provides a (partial or complete) per-logical block classification. Assuming a logical block size of 4 Kbytes (Windows OS default) and a bitmask for each block of 64 values (8 bytes), a block map database containing a bitmask representation for all logical blocks of a file system volume would consume only 1:512 (~0.2%) of the file system volume space.

As discussed above, the space for the block map database could be reserved at the start of the initial logical block walking process and mapped to a file within the file system volume, e.g., the block map file 210. The block map file 210 may be marked as protected from relocation, and the logical blocks it represents excluded from an initial block range.

According to the above examples, during an initial logical block walk of the file system volume, many logical blocks may be identified as empty or high entropy (non-textual data). In such cases, the bitmask for the logical block is updated and no further processing may be done. Low-entropy, non-empty logical blocks on the other hand can be queued for more detailed analysis with one or more different analysis algorithms, the result of which can be an update to the per-logical block bitmask, and potentially re-queuing for further subsequent analysis.

By re-queuing blocks of interest on an on-going basis, many layers of analysis can be accommodated and added over time. Each pass potentially restricts the input to the next pass, allowing for more complex and costly analysis only when deemed appropriate.

When a file is written to the filesystem, a filesystem driver, or a filesystem filter driver, or functionally similar software, can be used to identify the underlying logical blocks representing the file. A native filesystem driver does this automatically to write the file, so this adds little cost to the filesystem filter driver, and the filesystem filter driver can deliver the logical block ranges to a high priority logical block walker queue. In this way the writing of files is minimally impacted as the analysis of the files is decoupled from file-level operations, and so the file write operation is not blocked by the analysis. Further, the analysis may only be performed for newly written logical blocks. The per-logical block classification of the unchanged file blocks is already available.

Data protection control is usually triggered by actions of interest, such as when data (e.g., in the form of a file) is copied or moved to a new location or moved to a cloud location. Detection of these actions of interest is relatively trivial, as is control based on the user performing the action, but in order to perform control actions based on the content of the data itself, classification of the data is better accomplished in advance to prevent the copy/move action being delayed unacceptably.

In the processes described herein, however, since a native filesystem driver identifies mapped logical blocks of a file, a filesystem filter driver can use the logical block identifiers to offset into a logical block map and derive a per-file classification by simply combining in some manner the per-logical block classifications for each of the logical blocks defining the file in a specified manner. Classification according to the above embodiments can then be used in a timely manner to control an action with a particular file. In some situations, a file might be copied before all the underlying logical blocks representing the file have been fully classified, for instance if the file has very recently been written itself. In this case, a decision can be made to add the logical blocks to a high priority queue and block the file action until classification is complete, or to operate on an incomplete classification already available.

Since the classification output for each logical block is stored, for example, in a bitmask, this allows one or more analysis tasks of a specific block range to be performed independently of the others, as discussed above with respect to the initial 'empty/low entropy/high entropy' analysis pass. Adding a new analysis algorithm or task then becomes a case of providing the binary code for the analysis task and queuing either some or all the logical blocks for classification with new analysis task.

As mentioned above, deciding which logical blocks to queue can be defined by rules to the LBA 225. As a simple example, a new analysis task for identifying source code may only be requested for logical blocks defined as low-entropy and non-empty during an initial discovery analysis pass. In this way both the classification tasks and the rules defining classification can be supplied dynamically to the computing system 501.

Figure 5:
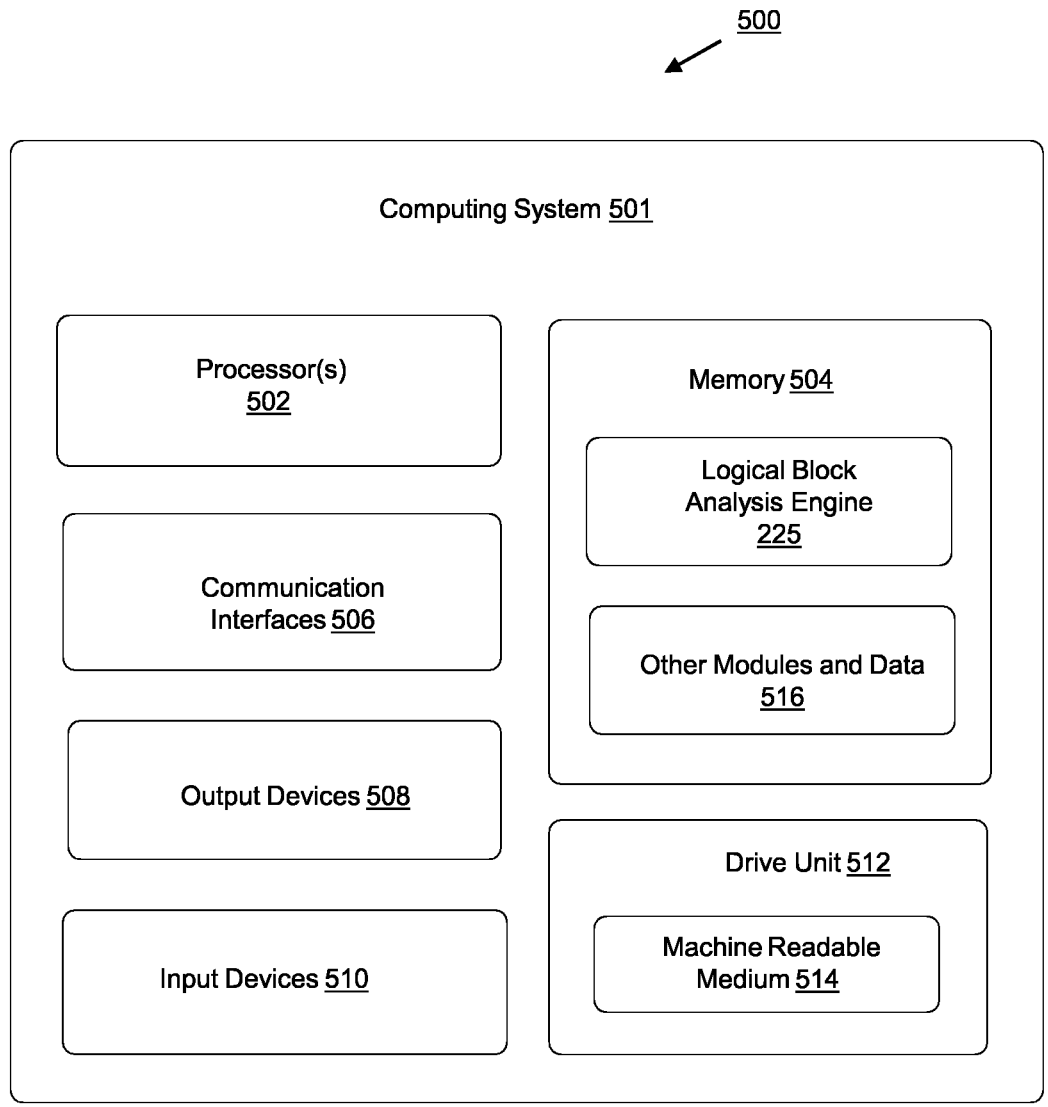
FIG. 5 is a functional block diagram of a computing system via which embodiments may be realized.

FIG. 5 shows an example system architecture 500 for a computing system 501 associated with the logical block analysis (LBA) engine 225 described herein. The computing system 501 can be a server, computer, or other type of computing device that executes one or more instances of logical block analysis engine 225. In some examples, the logical block analysis engine 225 can be executed by a dedicated computing system 501. In other examples, the computing system 501 can execute one or more logical block analysis engines 225 via virtual machines or other virtualized instances. For instance, the computing system 501 may execute multiple logical block analysis engines 225 in parallel, using different virtual machines, parallel threads, or other parallelization techniques.

The computing system 501 can include memory 504. In various examples, the memory 504 can include system memory, which may be volatile (such as RAM), non-volatile (such as ROM, flash memory, non-volatile memory express (NVMe), etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 501. Any such non-transitory computer-readable media may be part of the computing system 501.

The memory 504 can store data associated with the file system volume 115, queues 230 and 235, analysis algorithms 240, logical block analysis engine 225, and/or any other element of the embodiments disclosed herein. The memory 504 can also store other modules and data 516. The modules and data 516 can include any other modules and/or data that can be utilized by the computing system 501 to perform or enable performing the actions described herein. Such other modules and data can include a platform, operating system, and applications, and data utilized by the platform, operating system, and applications.

By way of a non-limiting example, the computing system 501 that executes the logical block analysis engine 225 may have non-volatile memory, such as an NVMe disk configured to store file system volume 115, queues 230 and 235, analysis algorithms 240, logical block analysis engine 225, and/or any other element of the embodiments disclosed herein. The computing system 501 that executes the logical block analysis engine 225 may also have volatile memory, such as synchronous dynamic RAM (SDRAM), double data rate (DDR) SDRAM, DDR2 SDRAM, DDR3 SDRAM, or DD4 SDRAM.

The computing system 501 can also have one or more processors 502. In various examples, each of the processors 502 can be a central processing unit (CPU), a graphics processing unit (GPU), both a CPU and a GPU, or any other type of processing unit. For example, each the processors 502 may be a 10-core CPU, or any other type of processor. Each of the one or more processors 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 502 may also be responsible for executing computer applications stored in the memory 504, which can be associated with types of volatile and/or non-volatile memory.

The computing system 501 can also have one or more communication interfaces 506. The communication interfaces 506 can include transceivers, modems, interfaces, antennas, telephone connections, and/or other components that can transmit and/or receive data over networks, telephone lines, or other connections. For example, the communication interfaces 506 can include one or more network cards that can be used to receive inputs and output results according to the above embodiments.

In some examples, the computing system 501 can also have one or more input devices 510, such as a keyboard, a mouse, a touch-sensitive display, voice input device, etc., and/or one or more output devices 508 such as a display, speakers, a printer, etc. These devices are well known in the art and need not be discussed at length here.

The computing system 501 may also include a drive unit 512 including a machine readable medium 514. The machine readable medium 514 can store one or more sets of instructions, such as software or firmware, that embodies any one or more of the methodologies or functions described herein. The instructions can also reside, completely or at least partially, within the memory 504, processor(s) 502, and/or communication interface(s) 506 during execution thereof by the computing system 501. The memory 504 and the processor(s) 502 also can constitute machine readable media 514.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method comprising:
receiving a selected one or more identifiers respectively corresponding to a one or more logical blocks in an electronic file system volume;
analyzing the one or more logical blocks respectively corresponding to the selected one or more identifiers, according to one or more criteria;
assigning a value to one or more indicators associated with each of the one or more logical blocks and corresponding to the one or more criteria, responsive to the analyses of the corresponding one or more logical blocks; and
generating a representation of the one or more indicators, and their respective assigned values, associated with each of the one or more logical blocks that was analyzed according to the one or more criteria.

2. The computer-implemented method of claim 1, wherein receiving the selected one or more identifiers respectively corresponding to the one or more logical blocks in the electronic file system volume comprises:
adding a one or more identifiers respectively corresponding to the one or more logical blocks in the electronic file system volume to a one or more queues; and
selecting from the one or more queues one or more identifiers respectively corresponding to the one or more logical blocks in the electronic file system volume.

3. The computer-implemented method of claim 1, wherein analyzing the one or more logical blocks respectively corresponding to the selected one or more identifiers, according to one or more criteria comprises analyzing, by one or more algorithms associated with the criteria, the one or more logical blocks respectively corresponding to the selected one or more identifiers.

4. The computer-implemented method of claim 1, further comprising maintaining in the electronic file system volume the representation of the one or more indicators, and their respective assigned values, associated with each of the one or more logical blocks that was analyzed.

5. The computer-implemented method of claim 1, further comprising:
identifying in the representation of the one or more indicators associated with each of the one or more logical blocks that was analyzed, one or more indicators that was assigned a selected value;
analyzing the one or more logical blocks associated with the one or more indicators that was identified as being assigned the selected value, according to one or more new criteria;
assigning a value to one or more indicators associated with each of the one or more logical blocks associated with the one or more indicators that was identified as being assigned the selected value and corresponding to the one or more new criteria, responsive to the analyses of the corresponding one or more logical blocks associated with the one or more indicators that was identified as being assigned the selected value; and
generating a representation of the one or more indicators, and their respective assigned values, associated with each of the one or more logical blocks that was analyzed according to the one or more new criteria.

6. The computer-implemented method of claim 1, wherein receiving the selected one or more identifiers respectively corresponding to a one or more logical blocks in an electronic file system volume comprises:
writing to an electronic file mapped to one or more logical blocks in the electronic file system volume;
receiving the one or more identifiers corresponding to one or more logical blocks in the electronic file system volume to which the file is mapped; and
adding to one or more queues the one or more identifiers corresponding to the one or more logical blocks in the electronic file system volume to which the file is mapped.

7. The computer-implemented method of claim 6, wherein adding to one or more queues the one or more identifiers corresponding to the one or more logical blocks in the electronic file system volume to which the file is mapped comprises adding to one or more queues only the one or more identifiers corresponding to the one or more logical blocks in the electronic file system volume to which the file is mapped that changed as a result of the writing to the electronic file.

8. The computer-implemented method of claim 1, further comprising:
receiving one or more identifiers corresponding to one or more logical blocks in the electronic file system to which an electronic file is mapped;
receiving the representation of the one or more indicators, and their respective assigned values, associated with each of the one or more logical blocks corresponding to the one or more identifiers corresponding to one or more logical blocks in the electronic file system to which the electronic file is mapped; and
assigning a value to one or more indicators associated with the electronic file based on the respective assigned values of the one or more indicators associated with each of the one or more logical blocks corresponding to the one or more identifiers corresponding to one or more logical blocks in the electronic file system to which the electronic file is mapped.

9. The computer-implemented method of claim 8, further comprising controlling an action to be performed on or with the electronic file based on the value assigned to the one or more indicators associated with the electronic file.

10. A computing system, comprising:
one or more processors;
memory storing computer-executable instructions that, when executed by the one or more processors, cause the one or more processors to perform operations comprising:
receiving a selected one or more identifiers respectively corresponding to a one or more logical blocks in an electronic file system volume;
analyzing the one or more logical blocks respectively corresponding to the selected one or more identifiers, according to one or more criteria;
assigning a value to one or more indicators associated with each of the one or more logical blocks and corresponding to the one or more criteria, responsive to the analyses of the corresponding one or more logical blocks; and
generating a representation of the one or more indicators, and their respective assigned values, associated with each of the one or more logical blocks that was analyzed according to the one or more criteria.

11. The computing system of claim 10, wherein the operations further comprise maintaining in the electronic file system volume the representation of the one or more indicators, and their respective assigned values, associated with each of the one or more logical blocks that was analyzed.

12. The computing system of claim 10, wherein the operations further comprise:
identifying in the representation of the one or more indicators associated with each of the one or more logical blocks that was analyzed, one or more indicators that was assigned a selected value;
analyzing the one or more logical blocks associated with the one or more indicators that was identified as being assigned the selected value, according to one or more new criteria;
assigning a value to one or more indicators associated with each of the one or more logical blocks associated with the one or more indicators that was identified as being assigned the selected value and corresponding to the one or more new criteria, responsive to the analyses of the corresponding one or more logical blocks associated with the one or more indicators that was identified as being assigned the selected value; and
generating a representation of the one or more indicators, and their respective assigned values, associated with each of the one or more logical blocks that was analyzed according to the one or more new criteria.

13. The computing system of claim 10, wherein the operations further comprise:
receiving one or more identifiers corresponding to one or more logical blocks in the electronic file system to which an electronic file is mapped;
receiving the representation of the one or more indicators, and their respective assigned values, associated with each of the one or more logical blocks corresponding to the one or more identifiers corresponding to one or more logical blocks in the electronic file system to which the electronic file is mapped; and assigning a value to one or more indicators associated with the electronic file based on the respective assigned values of the one or more indicators associated with each of the one or more logical blocks corresponding to the one or more identifiers corresponding to one or more logical blocks in the electronic file system to which the electronic file is mapped.

14. The computing system of claim 13, wherein the operations further comprise controlling an action to be performed on or with the electronic file based on the value assigned to the one or more indicators associated with the electronic file.

15. One or more non-transitory computer-readable media storing computer-executable instructions for an electronic file logical block analysis engine that, when executed by one or more processors, cause the one or more processors to perform operations comprising:
   receiving a selected one or more identifiers respectively corresponding to a one or more logical blocks in an electronic file system volume;
   analyzing the one or more logical blocks respectively corresponding to the selected one or more identifiers, according to one or more criteria;
   assigning a value to one or more indicators associated with each of the one or more logical blocks and corresponding to the one or more criteria, responsive to the analyses of the corresponding one or more logical blocks; and
   generating a representation of the one or more indicators, and their respective assigned values, associated with each of the one or more logical blocks that was analyzed according to the one or more criteria.

16. The one or more non-transitory computer-readable media of claim 15, wherein the operations further comprise maintaining in the electronic file system volume the representation of the one or more indicators, and their respective assigned values, associated with each of the one or more logical blocks that was analyzed.

17. The one or more non-transitory computer-readable media of claim 15, wherein the operations further comprise:
   identifying in the representation of the one or more indicators associated with each of the one or more logical blocks that was analyzed, one or more indicators that was assigned a selected value;
   analyzing the one or more logical blocks associated with the one or more indicators that was identified as being assigned the selected value, according to one or more new criteria;
   assigning a value to one or more indicators associated with each of the one or more logical blocks associated with the one or more indicators that was identified as being assigned the selected value and corresponding to the one or more new criteria, responsive to the analyses of the corresponding one or more logical blocks associated with the one or more indicators that was identified as being assigned the selected value; and generating a representation of the one or more indicators, and their respective assigned values, associated with each of the one or more logical blocks that was analyzed according to the one or more new criteria.

18. The one or more non-transitory computer-readable media of claim 15, wherein receiving the selected one or more identifiers respectively corresponding to a one or more logical blocks in an electronic file system volume comprises:
   writing to an electronic file mapped to one or more logical blocks in the electronic file system volume;
   receiving the one or more identifiers corresponding to one or more logical blocks in the electronic file system volume to which the file is mapped; and
   adding to one or more queues the one or more identifiers corresponding to the one or more logical blocks in the electronic file system volume to which the file is mapped.

19. The one or more non-transitory computer-readable media of claim 15, wherein the operations further comprise:
   receiving one or more identifiers corresponding to one or more logical blocks in the electronic file system to which an electronic file is mapped;
   receiving the representation of the one or more indicators, and their respective assigned values, associated with each of the one or more logical blocks corresponding to the one or more identifiers corresponding to one or more logical blocks in the electronic file system to which the electronic file is mapped; and
   assigning a value to one or more indicators associated with the electronic file based on the respective assigned values of the one or more indicators associated with each of the one or more logical blocks corresponding to the one or more identifiers corresponding to one or more logical blocks in the electronic file system to which the electronic file is mapped.

20. The one or more non-transitory computer-readable media of claim 19, wherein the operations further comprise controlling an action to be performed on or with the electronic file based on the value assigned to the one or more indicators associated with the electronic file.

* * * * *